US012436730B2

United States Patent
Ota

(10) Patent No.: US 12,436,730 B2
(45) Date of Patent: Oct. 7, 2025

(54) AUDIO DEVICE

(71) Applicant: D&M Holdings INC., Kanagawa (JP)

(72) Inventor: Yuji Ota, Kanagawa (JP)

(73) Assignee: D&M HOLDINGS INC., Kanagawa (JP)

( * ) Notice: Subject to any disclaimer, the term of this patent is extended or adjusted under 35 U.S.C. 154(b) by 228 days.

(21) Appl. No.: 18/044,238

(22) PCT Filed: Mar. 26, 2021

(86) PCT No.: PCT/JP2021/012843
§ 371 (c)(1),
(2) Date: Mar. 7, 2023

(87) PCT Pub. No.: WO2022/054321
PCT Pub. Date: Mar. 17, 2022

(65) Prior Publication Data
US 2023/0333807 A1    Oct. 19, 2023

(30) Foreign Application Priority Data

Sep. 10, 2020 (JP) .................................. 2020-151986

(51) Int. Cl.
*G06F 3/16* (2006.01)
*G06F 3/01* (2006.01)

(52) U.S. Cl.
CPC .............. *G06F 3/165* (2013.01); *G06F 3/017* (2013.01); *G06F 3/167* (2013.01)

(58) Field of Classification Search
CPC ........... G06F 3/165; G06F 3/017; G06F 3/167
See application file for complete search history.

(56) References Cited

U.S. PATENT DOCUMENTS

2018/0182387 A1* 6/2018 Chua ...................... H04R 1/406
2018/0285062 A1* 10/2018 Ulaganathan ........... G10L 15/22
2019/0371334 A1   12/2019 Takayanagi et al.
(Continued)

FOREIGN PATENT DOCUMENTS

| JP | 2014-026603 A | 2/2014 |
| JP | 2014-219614 A | 11/2014 |
| WO | 2020/079941 A1 | 4/2020 |

*Primary Examiner* — Fan S Tsang
*Assistant Examiner* — David Siegel
(74) *Attorney, Agent, or Firm* — Nieves IP Law Group, LLC; Peter A. Nieves

(57) ABSTRACT

[Problem] To provide an audio device with which remote operation is possible without using a remote controller, even during audio output. [Solution] A wireless speaker 1 is provided with a speech command recognizing unit 17 which subjects a speech signal input into a microphone 11 to speech recognition processing to recognize an utterance of a listener, and detects a speech commands of the listener from the recognition result, and is additionally provided with; a motion command recognizing unit 18 which subjects a video signal captured by a camera 12 to motion recognition processing to recognize a gesture of the listener, and detects a motion command of the listener from the recognition result; and a main control unit 20 which implements various types of control of the wireless speaker 1 on the basis of the speech command recognized by the speech command recognizing unit 17 and the motion command recognized by the motion command recognizing unit 18.

5 Claims, 3 Drawing Sheets

(56) References Cited

U.S. PATENT DOCUMENTS

2019/0394602 A1* 12/2019 Moore .................... H04S 7/305
2020/0302947 A1*  9/2020 Singh .................. G10L 21/0216
2021/0070221 A1*  3/2021 Neiswander ........... B60K 37/20

* cited by examiner

AUDIO DEVICE

TECHNICAL FIELD

The present invention relates to a remote operation technology for an audio device, such as an audio player or a wireless speaker.

BACKGROUND ART

In recent years, an audio device having a voice operation reception function with which various operations, such as reproduction, stop, and increase or decrease of a volume level of audio data, can be received via voice has become popular (for example, Patent Literatures 1 and 2).

In the audio device of this type, a voice command of a user is recognized from a voice signal input to a microphone, and various kinds of control of the audio device are executed based on the recognized voice command. In this manner, the audio device can be remotely operated without using a remote controller.

CITATION LIST

Patent Literature

[PTL 1] JP 2014-219614 A
[PTL 2] JP 2014-026603 A

SUMMARY OF INVENTION

Technical Problem

However, in the related-art audio device having the voice operation reception function, when an output volume of the audio is large, in some cases, the audio device cannot correctly recognize the voice command of the user from the voice signal input to the microphone during audio output, and thus fails to receive the voice operation. In such cases, the user is required to move to an installation location of the audio device so as to operate an operation panel of the audio device to directly input an instruction, which is troublesome.

The present invention has been made in view of the above-mentioned circumstance, and has an object to provide an audio device with which remote operation is allowed without using a remote controller even during audio output.

Solution to Problem

In order to solve the above-mentioned problem, an audio device according to the present invention has mounted therein, in addition to a voice command recognition function for recognizing a voice command of a user from a voice signal input to a microphone, a motion command recognition function for recognizing a motion command of the user from a video signal captured by a camera. Various types of control of an own device are executed based on the voice command of the user recognized by the voice command recognition function and the motion command recognized by the motion command recognition function.

For example, according to the present invention, there is provided an audio device for outputting audio data, including: a microphone; a camera; voice command recognition means for recognizing a voice command of a user from a voice signal input to the microphone; motion command recognition means for recognizing a motion command of the user from a video signal captured by the camera; and control means for executing control of an own device based on the voice command recognized by the voice command recognition means and the motion command recognized by the motion command recognition means.

Advantageous Effects of Invention

The audio device according to the present invention has mounted therein the motion command recognition function for recognizing the motion command of the user from the video signal captured by the camera, in addition to the voice command recognition function for recognizing the voice command of the user from the voice signal input to the microphone. Accordingly, during the audio output, even when the output volume of the audio is large and thus the voice command of the user cannot be correctly recognized from the voice signal input to the microphone, the remote operation can be received from the user via gestures. Thus, according to the audio device of the present invention, the remote operation is allowed without using a remote controller even during the audio output.

DESCRIPTION OF EMBODIMENTS

Now, one embodiment of the present invention is described with reference to the accompanying drawings.

Figure 1:
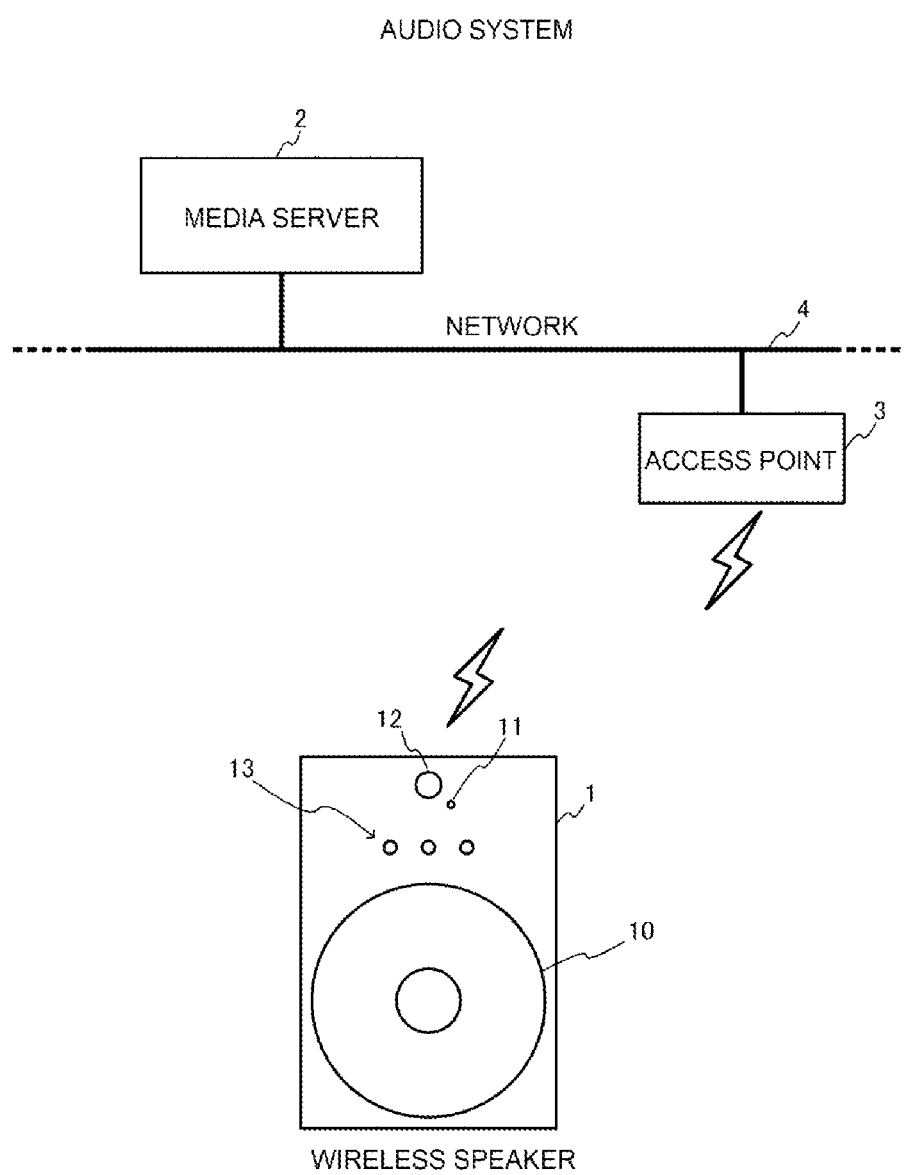
FIG. 1 is a schematic configuration diagram of an audio system including a wireless speaker (1) according to one embodiment of the present invention.

FIG. 1 is a schematic configuration diagram of an audio system including a wireless speaker 1 according to this embodiment.

As illustrated in the figure, the wireless speaker 1 according to this embodiment is connected to a media server 2 via an access point 3 and a network 4, such as a WAN or a LAN. The wireless speaker 1 downloads audio data from the media server 2 so as to reproduce and output the audio data.

Figure 2:
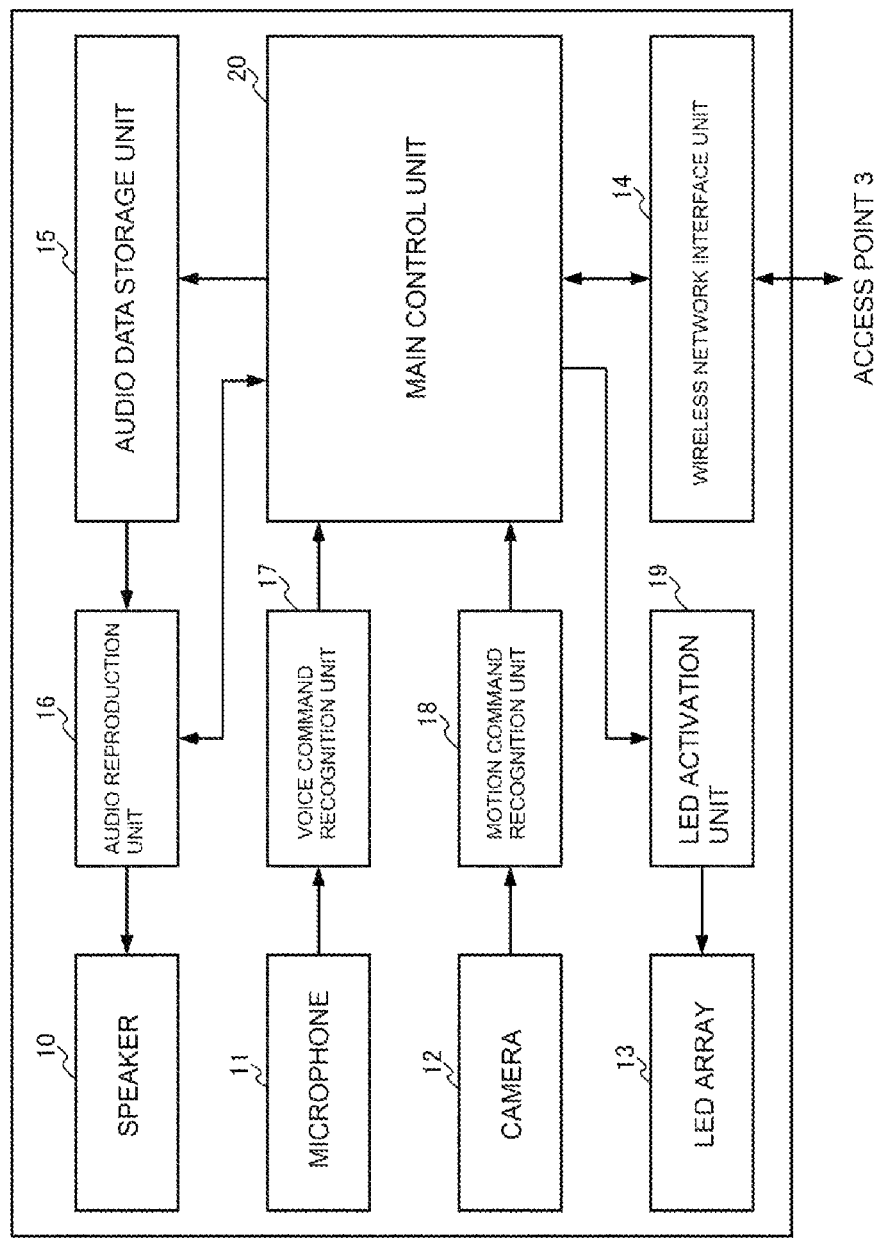
FIG. 2 is a schematic function configuration diagram of the wireless speaker (1).

FIG. 2 is a schematic function configuration diagram of the wireless speaker 1.

As illustrated in the figure, the wireless speaker 1 includes a speaker 10, a microphone 11, a camera 12, an LED array 13 formed of a plurality of LEDs, a wireless network interface unit 14, an audio data storage unit 15, an audio reproduction unit 16, a voice command recognition unit 17, a motion command recognition unit 18, an LED activation unit 19, and a main control unit 20.

As illustrated in FIG. 1, the speaker 10, the microphone 11, the camera 12, and the LED array 13 are provided on a front surface of the wireless speaker 1. The microphone 11 collects a voice of a listener present at a listening point of the speaker 10, and the camera 12 picks up an image of the listener present at the listening point of the speaker 10. Further, the LED array 13 informs the listener of an operation mode of the wireless speaker 1 (any of a voice command recognition mode and a motion command recognition mode which are to be described later) by means of a display mode of the plurality of LEDs.

The wireless network interface unit 14 is an interface for wireless connection to the access point 3.

In the audio data storage unit 15, the audio data downloaded from the media server 2 is stored.

The audio reproduction unit 16 reproduces the audio data stored in the audio data storage unit 15 so as to output a reproduction signal of the audio data from the speaker 10.

The voice command recognition unit 17 executes voice recognition processing on a voice signal input to the microphone 11 so as to recognize utterance contents of the listener. Then, the voice command recognition unit 17 detects a voice command of the listener from recognition results of the utterance contents. For example, the voice command recognition unit 17 detects voice commands, such as "reproduction start" for giving an instruction to start reproduction of the audio data, "reproduction stop" for giving an instruction to stop the reproduction of the audio data, "switching of selected music" for giving an instruction to switch the audio data to be reproduced, "volume up" for giving an instruction to increase the volume of the reproduced sound, and "volume down" for giving an instruction to decrease the volume of the reproduced sound. As the voice command recognition unit 17, for example, technologies as described in Patent Literatures 1 and 2 described above and the like can be used.

The motion command recognition unit 18 executes motion recognition processing on a video signal captured by the camera 12 so as to recognize a gesture of the listener. Then, the motion command recognition unit 18 detects a motion command of the listener from recognition results of the gesture. For example, the motion command recognition unit 18 detects "a gesture of, from a state of raising one hand, rotating this hand" for giving an instruction to switch the audio data to be reproduced, "a gesture of, from a state of raising both hands, waving those hands from side to side" for giving an instruction to stop the reproduction of the audio data, "a gesture of, from a state of putting and retaining one hand down, raising this hand" for giving an instruction to increase the volume of the reproduced sound, "a gesture of, from a state of putting and retaining one hand up, lowering this hand" for giving an instruction to decrease the volume of the reproduced sound, and the like. As the motion command recognition unit 18, for example, technologies as described in WO 2016/051521 A1, JP 2013-517051 A, and the like can be used.

The LED activation unit 19 controls the drive of each of the LEDs forming the LED array 13.

In addition, the main control unit 20 comprehensively controls the units 10 to 19 of the wireless speaker 1. For example, when the operation mode is the voice command recognition mode, the main control unit 20 executes various kinds of control of the wireless speaker 1 based on the voice command detected by the voice command recognition unit 17, and when the operation mode is the motion command recognition mode, the main control unit 20 executes various kinds of control of the wireless speaker 1 based on the motion command detected by the motion command recognition unit 18. Further, the main control unit 20 sets the operation mode based on a reproduction state of the audio data, and causes the LED activation unit 19 to drive the LED array 13 in a display mode corresponding to the operation mode.

The functional configuration of the wireless speaker 1 illustrated in FIG. 2 may be implemented by hardware through use of an integrated logic IC, such as an application specific integrated circuit (ASIC) or a field programmable gate array (FPGA), or may be implemented by software through use of a computer such as a digital signal processor (DSP). Alternatively, the functional configuration may be implemented by a computer system including a CPU, a memory, a flash memory, an auxiliary storage device such as a hard disk drive, and a wireless communication device such as a wireless LAN adaptor, causing the CPU to load a predetermined program into the memory from the auxiliary storage device and execute the program.

Figure 3:
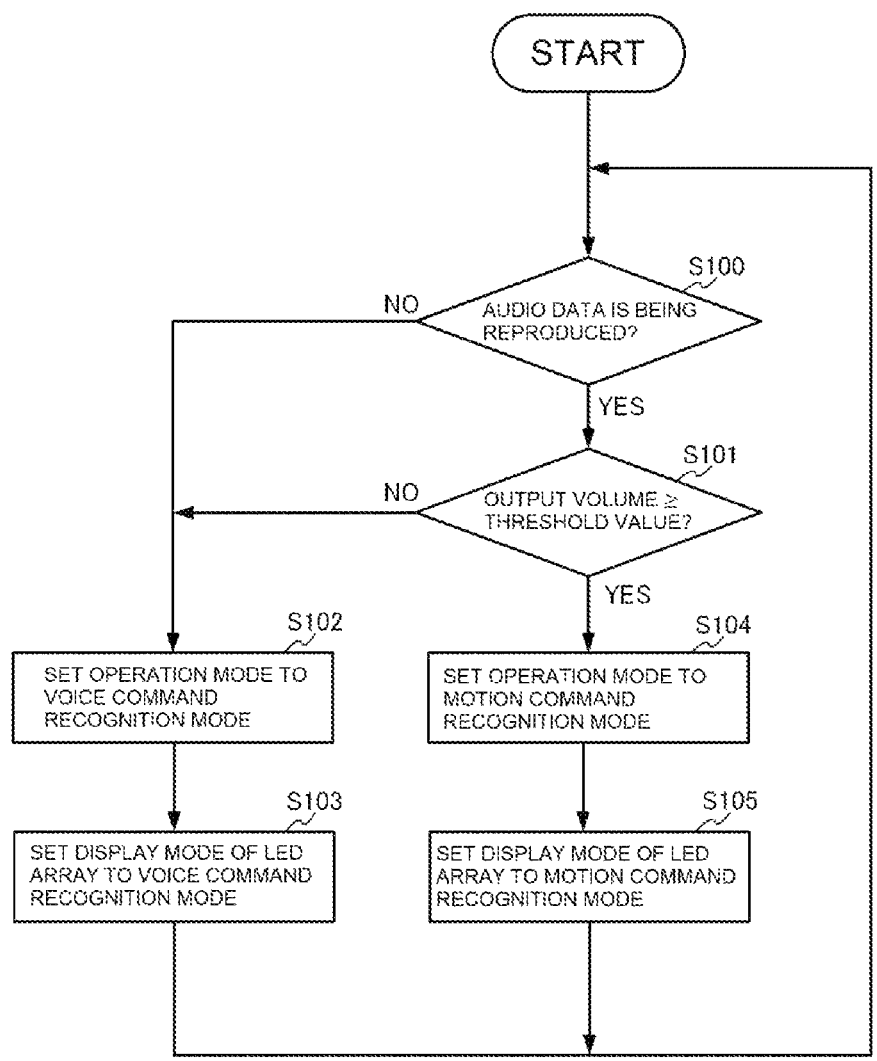
FIG. 3 is a flow chart for illustrating operation mode setting processing of the wireless speaker 1 illustrated in FIG. 2.

FIG. 3 is a flow chart for illustrating operation mode setting processing of the wireless speaker 1 illustrated in FIG. 2.

When the audio reproduction unit 16 is not reproducing the audio data (NO in Step S100), or when the audio reproduction unit 16 is reproducing the audio data (YES in Step S100), but the output volume of the audio data is smaller than a predetermined threshold value (NO in Step S101), the main control unit 20 sets the operation mode of the wireless speaker 1 to the voice command recognition mode (Step S102). In this manner, the main control unit 20 executes various kinds of control of the wireless speaker 1 based on the voice command detected by the voice command recognition unit 17. Further, the main control unit 20 instructs the LED activation unit 19 to perform voice command recognition mode display. In response thereto, the LED activation unit 19 turns on the LED array 13 and causes the LED array 13 to display in the display mode of the voice command recognition mode (Step S103). For example, all of the LEDs forming the LED array 13 are turned on.

Further, when the audio reproduction unit 16 is reproducing the audio data at an output volume that is equal to or larger than the predetermined threshold value (YES in both of Step S100 and Step S101), the main control unit 20 sets the operation mode of the wireless speaker 1 to the motion command recognition mode (Step S104). In this manner, the main control unit 20 executes various kinds of control of the wireless speaker 1 based on the motion command detected by the motion command recognition unit 18. Further, the main control unit 20 instructs the LED activation unit 19 to perform motion command recognition mode display. In response thereto, the LED activation unit 19 turns on the LED array 13 and causes the LED array 13 to display in a display mode of the motion command recognition mode (Step S105). For example, the LEDs forming the LED array 13 are repeatedly blinked in a predetermined order.

In the above, one embodiment of the present invention has been described.

The wireless speaker 1 according to this embodiment includes, in addition to the voice command recognition unit 17 for recognizing an utterance of a listener by executing voice recognition processing on a voice signal input to the microphone 11, and for detecting a voice command of the listener from recognition results of the voice signal, the motion command recognition unit 18 for recognizing a gesture of the listener by executing motion recognition processing on a video signal captured by the camera 12, and for detecting a motion command of the listener from recognition results of the gesture. Accordingly, during the reproduction of the audio data, even when the output volume of the audio data is large and thus the voice command of the listener cannot be correctly recognized from the voice signal input to the microphone 11, the remote operation can be received from the listener via gestures. Thus, according to this embodiment, the remote operation is allowed without using a remote controller even during the reproduction of the audio data.

Further, the wireless speaker 1 according to this embodiment operates in the voice command recognition mode during the stop of the reproduction of the audio data or, even during the reproduction of the audio data, when the output volume of the audio data is smaller than a predetermined threshold value, and the wireless speaker 1 according to this embodiment operates in the motion command recognition mode when, during the reproduction of the audio data, the output volume of the audio data is equal to or larger than the predetermined threshold value, that is, when it is highly possible that the voice command cannot be correctly recognized. In the case of the voice command recognition mode, the operations of the camera 12 and the motion command recognition unit 18 are stopped, and in the case of the motion command recognition mode, the operations of the microphone 11 and the voice command recognition unit 17 are stopped. In this manner, unrequired power consumption can be reduced, and thus power saving can be achieved.

Further, the wireless speaker 1 according to this embodiment changes the display mode of the LED array 13 in accordance with the operation mode so as to inform the listener of the present operation mode. Accordingly, the listener can remotely operate the wireless speaker 1 by means of an appropriate method in accordance with the operation mode (utterance of the voice command or gesture corresponding to the motion command).

The present invention is not limited to the above-mentioned embodiment, and various changes may be made thereto within the scope of the gist of the present invention.

For example, in the above-mentioned embodiment, the listener is informed of the operation mode by changing the display mode of the LED array 13 formed of the plurality of LEDs, but the listener may be informed of the operation mode by means of a display mode of a single LED (turning on, blinking, or the like). Further, the operation mode may be displayed on a display panel such as an LCD in place of the LED array 13. Still further, instead of performing turn-on display by the LED array 13, or together with the turn-on display performed by the LED array 13, when the operation mode has been changed, a voice message indicating the change may be output from the speaker 10. That is, when the operation mode has been changed, the main control unit 20 notifies the audio reproduction unit 16 of the operation mode after the change so as to instruct the audio reproduction unit 16 to output the voice message. In response thereto, the audio reproduction unit 16 reproduces a sound source corresponding to the notified operation mode so as to output, from the speaker 10, a voice message indicating that the operation mode has been changed to the notified operation mode.

Further, in the above-mentioned embodiment, when the operation mode has been changed from the voice command recognition mode to the motion command recognition mode, a voice message for urging the listener to make a gesture toward the camera 12 may be output to the listener. That is, when the operation mode has been changed from the voice command recognition mode to the motion command recognition mode, the main control unit 20 notifies the audio reproduction unit 16 of the change to the motion command recognition mode so as to instruct the audio reproduction unit 16 to output a voice message. In response thereto, the audio reproduction unit 16 reproduces a sound source corresponding to the motion command recognition mode so as to output to the listener, from the speaker 10, the voice message for urging the listener to make a gesture toward the camera 12 because the operation mode has been changed to the motion command recognition mode.

Further, in the above-mentioned embodiment, during the stop of the reproduction of the audio data, or, even during the reproduction of the audio data, when the output volume of the audio data is smaller than the predetermined threshold value, the operation is performed in the voice command recognition mode, and, during the reproduction of the audio data, when the output volume of the audio data is equal to or larger than the predetermined threshold value, that is, when it is highly possible that the voice command cannot be correctly recognized, the operation is performed in the motion command recognition mode. However, the present invention is not limited thereto.

For example, a volume level of an environment noise component included in the voice signal input to the microphone 11 may be monitored. When the volume level of the environment noise component is smaller than a predetermined threshold value, the operation may be performed in the voice command recognition mode, and when the volume level of the environment noise component is equal to or larger than the predetermined threshold value, that is, when it is highly possible that the voice command cannot be correctly recognized, the operation may be performed in the motion command recognition mode.

As another example, both of the voice command recognition mode and the motion command recognition mode may be simultaneously activated. That is, the microphone 11 and the voice command recognition unit 17, and the camera 12 and the motion command recognition unit 18 may be simultaneously activated so that, when the voice command is recognized by the voice command recognition unit 17, various kinds of control of the wireless speaker 1 are executed in accordance with this voice command, and when the motion command is recognized by the motion command recognition unit 18, various kinds of control of the wireless speaker 1 are executed in accordance with this motion command.

Further, in the above-mentioned embodiment, the case in which commands are assigned to gestures using hands is given as an example, but commands may be assigned to, for example, gestures using parts other than hands, such as fingers and a face (eyes, eyeballs, mouth, or the like), or combinations of gestures using a plurality of parts.

Further, in the above-mentioned embodiment, commands are assigned to gestures determined in advance, but the commands may be assigned to gestures determined by the listener. As another example, pieces of correspondence information between the commands and the gestures may be stored in the wireless speaker 1 for each of other electronic devices (smartphones, tablet PCs, portable audio players, and the like) which employ command input using gestures, and the wireless speaker 1 may recognize the command from the gesture of the listener in accordance with a piece of correspondence information selected by the listener from among those pieces of correspondence information. In this manner, the listener can operate the wireless speaker 1 with the same gesture as those for the other devices that are used by the listener.

Further, in the above-mentioned embodiment, the wireless speaker 1 is described as an example, but the present invention is widely applicable to an audio device for outputting audio data, such as an audio player or an audio amplifier.

REFERENCE SIGNS LIST

1: wireless speaker, 2: media server, 3: access point, 4: network, 10: speaker, 11: microphone, 12: camera, 13: LED array, 14: wireless network interface unit, 15: audio data storage unit, 16: audio reproduction unit, 17: voice command recognition unit, 18: motion command recognition unit, 19: LED drive unit, 20: main control unit

The invention claimed is:

1. An audio device for outputting audio data, comprising:
a microphone;
a camera;
voice command recognition means for recognizing a voice command of a user from a voice signal input to the microphone;
motion command recognition means for recognizing a motion command of the user from a video signal captured by the camera; and
control means for executing control of an own device based on the voice command recognized by the voice command recognition means and the motion command recognized by the motion command recognition means,
wherein the control means is configured to:
operate, during a stop of output of the audio data, or, during the output of the audio data, when an output volume of the audio data is smaller than a predetermined value, in a voice command recognition mode in which the control of the own device is executed based on the voice command recognized by the voice command recognition means; and
operate, during the output of the audio data, when the output volume of the audio data is equal to or larger than the predetermined value, in a motion command recognition mode in which the control of the own device is executed based on the motion command recognized by the motion command recognition means.

2. The audio device according to claim 1, further comprising operation mode notification means for notifying a user of whether an operation mode of the control means is the voice command recognition mode or the motion command recognition mode.

3. The audio device according to claim 2, wherein the operation mode notification means includes at least one light emitting diode, and is configured to notify the user of the operation mode of the control means by means of a display mode of the at least one light emitting diode.

4. The audio device according to claim 2, wherein the operation mode notification means is configured to output, when the operation mode of the control means has been changed, a voice message indicating that the operation mode of the control means has been changed.

5. The audio device according to claim 2, wherein the operation mode notification means is configured to output, when the operation mode of the control means has been changed from the voice command recognition mode to the motion command recognition mode, a voice message for urging the user to make a gesture toward the camera.

* * * * *